United States Patent [19]
Neri et al.

[11] Patent Number: 5,636,727
[45] Date of Patent: *Jun. 10, 1997

[54] DEVICE FOR FEEDING REELS TO A USER MACHINE

[75] Inventors: Armando Neri, Bologna; Verter Cesari, Granarolo Emilia, both of Italy

[73] Assignee: G.D. S.p.A., Bologna, Italy

[*] Notice: The terminal 18 months of this patent has been disclaimed.

[21] Appl. No.: 63,807

[22] Filed: May 20, 1993

[30] Foreign Application Priority Data

May 26, 1992 [IT] Italy ................................. BO92A0214

[51] Int. Cl.⁶ .................................................. B65G 37/00
[52] U.S. Cl. .......................... 198/574; 414/278; 414/281; 198/463.3
[58] Field of Search ................. 198/409, 463.3, 198/457, 574, 586, 312, 317; 414/278, 281, 282

[56] References Cited

U.S. PATENT DOCUMENTS

| | | | |
|---|---|---|---|
| 2,790,567 | 4/1957 | Rockhill | 198/463.3 |
| 3,055,478 | 9/1962 | Du Broff et al. | 198/463.3 X |
| 3,337,069 | 8/1967 | Burger | 414/278 |
| 4,219,301 | 8/1980 | Freeman . | |
| 4,320,826 | 3/1982 | Kramer et al. | 198/468.6 X |
| 4,331,418 | 5/1982 | Klebe | 414/282 X |
| 4,358,239 | 11/1982 | Dechantsreiter | 414/282 X |
| 4,406,570 | 9/1983 | Duncan et al. | 414/282 |
| 4,566,838 | 1/1986 | Binning et al. | 414/278 |
| 4,712,964 | 12/1987 | van Elten et al. | 198/468.6 X |
| 4,924,999 | 5/1990 | Kikuchi et al. | 198/409 |
| 4,925,000 | 5/1990 | Pacákoyá et al. | 198/409 |
| 5,082,192 | 1/1992 | Langen et al. | 198/409 X |
| 5,141,095 | 8/1992 | Kamp . | |
| 5,147,026 | 9/1992 | Scaglia | 198/409 |

FOREIGN PATENT DOCUMENTS

| | | | |
|---|---|---|---|
| 0022447 | 1/1981 | European Pat. Off. | 198/574 |
| 0082719 | 7/1981 | Japan | 198/463.3 |
| 0002610 | 1/1986 | Japan | 198/463.3 |
| 0154510 | 6/1988 | Japan | 198/463.3 |
| 404144825 | 5/1992 | Japan | 198/463.3 |
| 1576451 | 7/1990 | U.S.S.R. | 414/278 |

*Primary Examiner*—D. Glenn Dayoan
*Attorney, Agent, or Firm*—Guido Modiano; Albert Josif; Daniel O'Byrne

[57] ABSTRACT

Device for transferring reels grouped in stacks from a fixed supporting surface to a magazine for feeding a user machine; the magazine is arranged at a higher level than the fixed supporting surface, and the device is a lifting device provided with a lifting platform movable in a vertical direction between a loading position, which has an adjustable level and is adjacent to the fixed supporting surface, and an unloading position, wherein the platform forms an input portion of the magazine.

9 Claims, 3 Drawing Sheets

DEVICE FOR FEEDING REELS TO A USER MACHINE

BACKGROUND OF THE INVENTION

The present invention relates to a device for feeding reels to a user machine.

In particular, the present invention relates to a feeder device which can be advantageously used to transfer reels of material in tape form from a fixed supporting surface, on which the reels are superimposed one above the other so as to form one or more stacks, to a conveyor which normally forms an input magazine of a user machine and is arranged in a raised position with respect to said fixed supporting surface.

Known devices of the above described type generally comprise a lifting unit, which is arranged adjacent to said fixed supporting surface and is provided with a platform which can move between a lower loading station, in which said platform is arranged at a fixed level with respect to said supporting surface, and an upper station for feeding the spools to said conveyor.

Normally, the reels are transferred from the fixed supporting surface to said platform by an operator, who removes the reels manually and in succession from one of the stacks arranged on said fixed supporting surface and transfers them onto the platform, which is stationary in the lower loading station.

Known devices of the above described type have the drawback that they are scarcely ergonomic, since the reels, being stacked on the supporting surface, are transferred by an operator onto said platform starting from levels which vary progressively as the reels are removed from the related stacks and fed onto said platform. In other words, the movements that the operator performs to transfer a reel from the supporting surface to the platform constantly vary from one reel to the next and become relatively tiring in a short time.

Furthermore, in known devices of the above described type the transfer of the reels from said platform to said conveyor is generally difficult to perform.

SUMMMARY OF THE INVENTION

The aim of the present invention is to provide a device for feeding reels to a user machine which is free from the above described drawbacks.

According to the present invention, a device for feeding reels to a user machine is provided, said reels being grouped in stacks on a fixed supporting surface in order to be transferred to input conveyor means of the user machine, said conveyor means being arranged at a higher level than the fixed supporting surface; said device being a lifting device and being characterized in that it comprises: a lifting platform, for accommodating a plurality of said reels arranged edgeways; and actuation means for moving the platform between a loading position, which has an adjustable level and is adjacent to the fixed supporting surface, and an unloading position, wherein the platform forms an input portion of said conveyor means.

According to a preferred embodiment of the above defined feeder device, said platform comprises transfer means which are suitable to cause the advancement of said reels along said platform in a direction which is parallel to their axis; said transfer means cooperate, during use, with said conveyor means, when the platform is arranged in said unloading position, in order to cause the advancement of said reels toward said user machine.

In particular, preferably, said platform has a first end and a second end which respectively face the fixed supporting surface, when said platform is arranged in its loading position, and an input of said conveyor means, when the platform is arranged in its unloading position.

BRIEF DESCRIPTION OF THE DRAWINGS

The device according to the invention is now described with reference to the accompanying drawings, which illustrate a non-limitative example of embodiment thereof, wherein.

DESCRIPTION OF THE PREFERRED EMBODIMENTS

Figure 1:
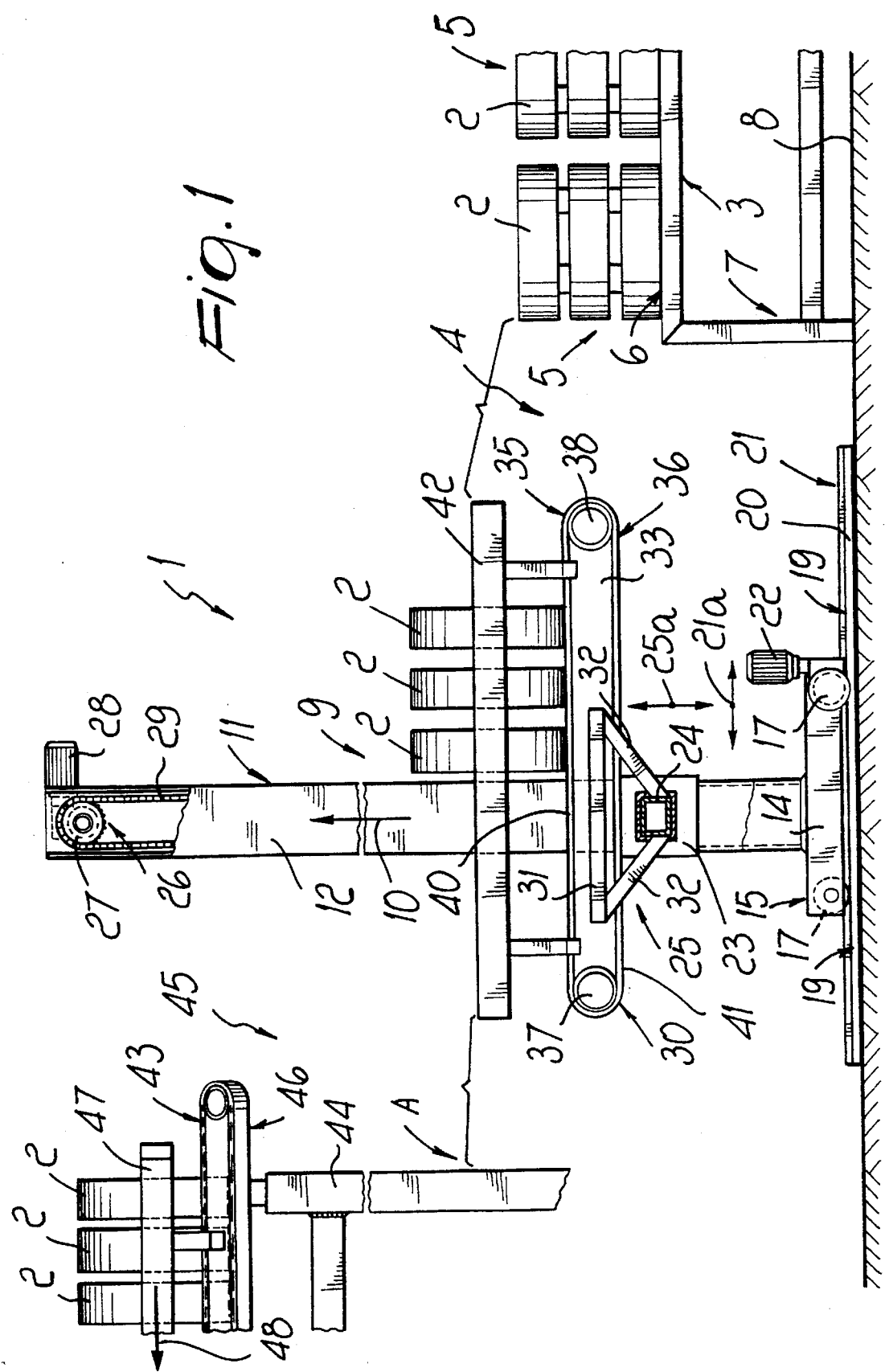
FIG. 1 is a lateral elevation view, with parts removed for the sake of clarity, of a preferred embodiment of the device according to the present invention.

In the accompanying figures, the numeral 1 generally designates a device for feeding reels 2 to a user machine A starting from a fixed support 3 which is arranged adjacent to a station 4 for loading said reels 2 onto the device 1. On the support 3, the reels 2 are placed flat and on top of one another in order to form a plurality of stacks 5 which are arranged mutually side by side and rest on a substantially horizontal upper surface 6 of the support 3. According to what is shown in FIG. 1, the surface 6 is supported by a frame 7 at a set fixed height above a floor 8.

Figure 2:
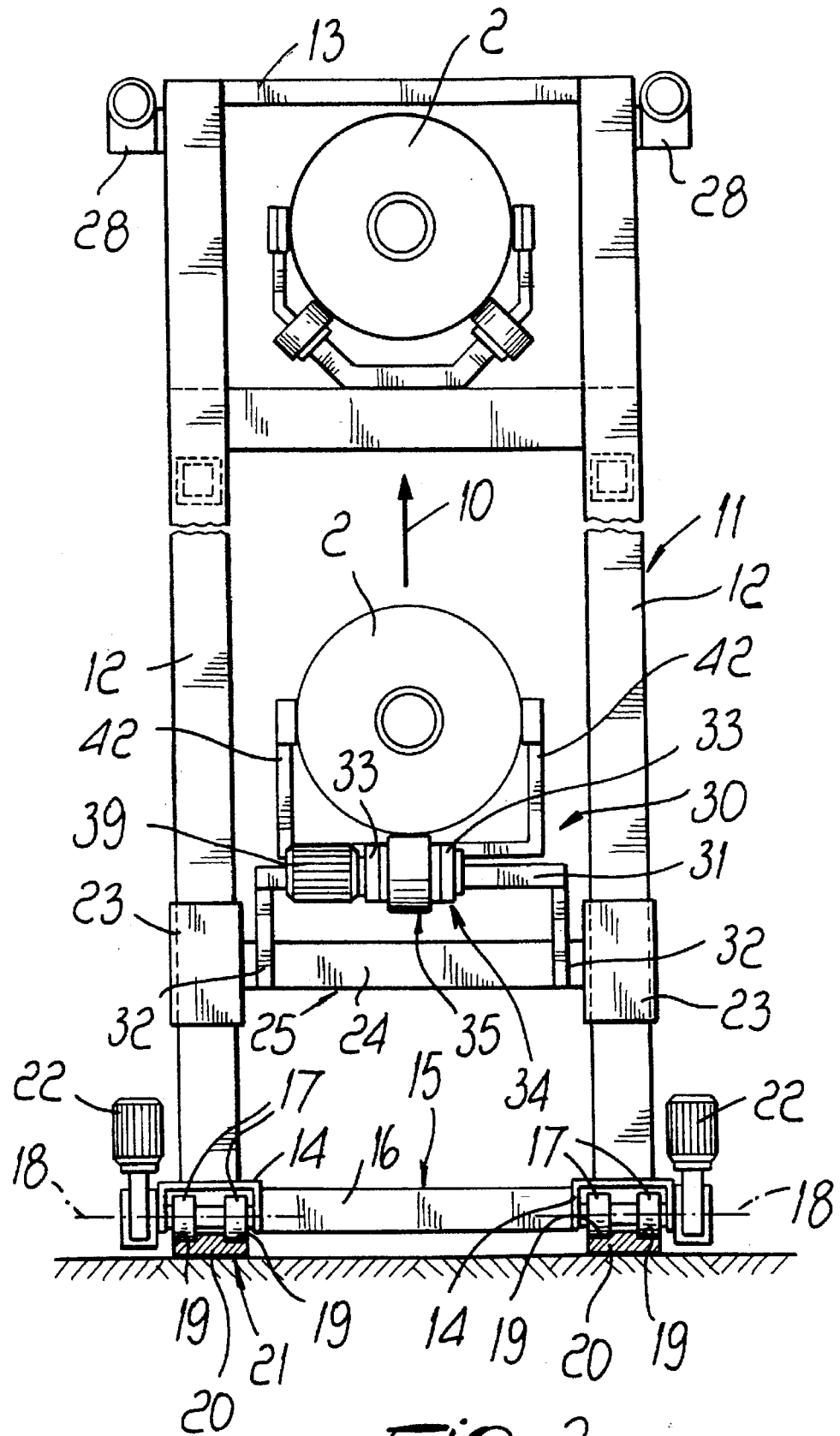
FIG. 2 is a lateral elevation view, with some parts shown in cross-section, of a detail of FIG. 1.

With reference to FIGS. 1 and 2, the device 1 comprises a lifting unit 9, which is arranged between the support 3 and the machine A to cause the advancement of the reels 2 in a substantially vertical direction 10, and comprises a portal-shaped frame 11 which is provided with two posts 12, each of which is C-shaped in transverse cross-section and has its concavity directed toward the other post 12, and extends vertically upward. The posts 12 furthermore have related upper end portions which are mutually connected by a cross-member 13 and related lower end portions, each of which is rigidly connected to a related member 14 of a carriage 15.

Each one of the members 14 has, in transverse cross-section, substantially the channel-shape of a "U" arranged so that it is open downward; said members are rigidly coupled to each other by a longitudinal plate 16 which is welded to said members 14; each member accommodates two pairs of wheels 17 which are arranged side by side, are mutually spaced and are rotatably mounted on respective end portions of the related members 14 so as to rotate about respective axes 18 which are at right angles to said members 14. The wheels 17 related to the same member 14 move along respective opposite tracks 19 of a related horizontal rail 20 which constitutes, together with the other rail 20, a guide 21 which extends in a direction 21a between the machine A and the support 3. The carriage 15 can move along the guide 21 under the thrust of a pair of reversible electric motors 22, each one of which actuates a related pair of wheels 17.

According to what is shown in FIGS. 1 and 2, a sleeve 23 is slidingly fitted on each post 12 and is connected to the other sleeve 23 by means of a tubular cross-member 24 which extends between said posts 12 and forms part of a slider 25 which is vertically movable, under the thrust of a known movement device 26, in a direction 25a.

In particular, the device 26 comprises, for each post 12, a pair of gears 27; a first gear 27 (FIG. 1) is rotatably coupled at a free end of the related post 12 and is keyed on an output shaft of a reversible electric step motor 28 supported by said related post 12; a second gear 27 (FIG. 3) is rotatably connected to the related sleeve 23 and is coupled to the related first gear 27 by means of a transmission chain 29 closed in a loop around said gears 27.

The slider 25 supports a platform 30 which is rigidly connected to the cross-member 24, extends between the posts 12 parallel to the floor 8 and to the supporting surface 6, and is suitable to accommodate a plurality of reels 2 which are transferred manually from the support 3 to said platform 30.

Figure 3:
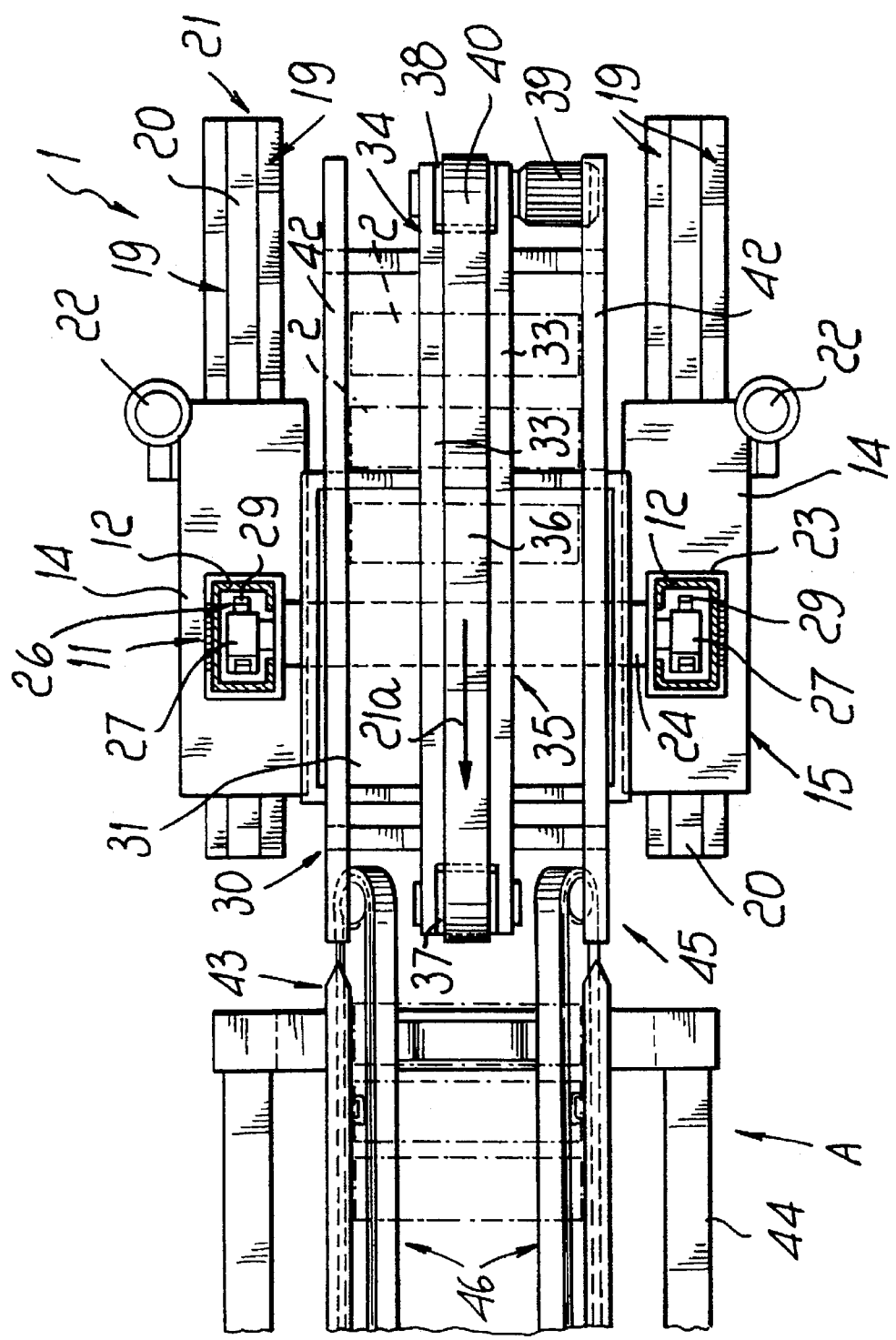
FIG. 3 is a partial plan view, with some parts shown in cross-section, of the device of FIG. 1.

With reference to FIG. 3, the platform 30 comprises a plate 31 which extends above the cross-member 24 and between the posts 12 in a position which is parallel to the floor 8, and is rigidly connected to said cross-member 24 by means of two brackets 32. The platform 30 furthermore comprises two longitudinal members 33 which extend between the posts 12 in the direction 21a and are individually rigidly connected to an intermediate portion of the plate 31.

The members 33 are provided with related end portions extending in a cantilever manner from the plate 31 and form a frame 34 for a conveyor 35 which comprises a belt 36 which is wound in a loop around a pair of guiding rollers 37 and 38, the second one of which is driven by an electric motor 39. The rollers 37 and 38 form, on the belt 36, a delivery-outgoing portion 40 and a return portion 41, the first of which extends in a position which is substantially parallel to the floor 8 and to the surface 6 and constitutes a horizontal transfer surface for the reels 2, which are supported edgeways by the portion 40 so that their axes are parallel to the direction 21a and are retained and guided laterally, at a substantially diametrical plane thereof which is parallel to the floor 8, by two lateral shoulders 42 being rigidly coupled to the members 33 and being also parallel to the direction 21a.

The machine A is provided with an input conveyor 43, which is supported by a related frame 44 in a raised position with respect to the surface 6, which faces the device 1 and is parallel to the direction 21a, and constitutes a buffer magazine for the reels 2. An input end of the conveyor 43 is arranged at an upper station 45 for the unloading of the reels 2 from the platform 30.

The conveyor 43 comprises, in a known manner, two belt transfer units 46 arranged side by side for supporting the reels 2 arranged edgeways, and two lateral shoulders 47 arranged on opposite sides with respect to the transfer units 46 and can be actuated stepwise to cause the advancement of the reels 2 in succession in a direction 48 which is parallel to the direction 21a.

During use, starting from the condition in which the lifting unit 9 is arranged in a rearward position being adjacent to the fixed support 3, by actuating the motors 28 it is possible to move the platform 30 into a first lowered loading position, wherein the portion 40 of the belt 36 arranges itself substantially at the same height as the topmost reel 2 of one of the stacks 5. At this point said reel 2 is removed manually by the operator and transferred onto the belt 36, which is subsequently made to advance by a set extent by the motor 39. Then the motors 28 are actuated and the platform 30 is moved further downward by a set extent which is substantially equal to the thickness of the reels 2, so as to again arrange the portion 40 substantially at the same level as the reel 2 which occupies the topmost position in said stack 5. This reel 2 is then transferred by the operator onto the platform 30.

The cycle continues in the described manner until loading of the lifting unit 9 has been completed; at this point the motors 22 and the motors 28 are actuated in succession, and the platform 30 is first moved along the guide 21 and moved into an advanced position which is adjacent to the frame 44, and is then raised until it reaches the unloading station 45, where the conveyor 35 enters, with a terminal output portion, between the input portions of the transfer units 46, and the platform 30 constitutes an input portion of the conveyor 43. Once this position has been reached, the motor 39 is actuated again and the reels 2 are transferred in succession onto the conveyor 43.

From the foregoing it is evident that the platform 30 not only allows to feed the reels 2 to the conveyor 43 in a very simple manner but, since said platform can be continuously positioned vertically when arranged at the loading station 4, and since in particular it can be constantly kept at a level which is at the most equal to the level occupied by a reel to be fed above said platform 30 with respect to the surface 6 of the support 3, it allows to minimize the muscular effort required to transfer the reels 2 from the support 3 to the lifting unit 9.

We claim:

1. Device for feeding reels from a fixed reel supporting surface to input portions of transfer units of a user machine, said transfer units being situated at a higher level than the fixed supporting surface, and said reels being placed flat one above the other and grouped in stacks on said fixed supporting surface; said device comprising:

a frame being movably supported on wheels, said wheels being guidable along a guide, said guide extending between said supporting surface and said user machine;

a lifting platform being slidingly supported on said frame, said lifting platform having a first and a second end extending in a cantilever manner therefrom;

conveyor means for accommodating and respectively advancing a plurality of said reels, said reels being arranged on said conveyor means edgeways along a horizontal transfer direction, and said conveyor means extending between said first and second ends of said lifting platform; and actuation means for moving said platform between a loading position in which, said first end of said platform is adjacent to said fixed supporting surface, and an unloading position, in which said conveyor means enters with an output end corresponding to said second end of said platform between said input portions of said transfer units, and wherein said loading position has a level which is adjustable by set extents, said set extents being substantially equal to a thickness of each of the reels arranged flat one above the other on said supporting platform.

2. Device according to claim 1, wherein said platform comprises transfer means which are adapted to cause the advancement of said reels along said platform in a direction which is parallel to their axis; said transfer means cooperating, during use, with said conveyor means, when said platform is arranged in said unloading position, to cause the advancement of said reels toward said user machine.

3. Device according to claim 1, wherein said frame comprises two vertically extending posts and a cross-member, said cross-member being connected to said posts at upper end portions thereof whereby said frame having a portal-shaped structure, and said lifting platform extending between said posts.

4. Device according to claim 1, further comprising first substantially vertical guiding means and first slider means which are slidingly mounted along said first guiding means and support said platform; said actuation means being interposed between said first guiding means and said first slider means.

5. Device according to claim 4, further comprising second guiding means which are substantially perpendicular to said first guiding means and second slider means movable along said second guiding means; said second slider means supporting said first guiding means.

6. Device for feeding reels from a fixed reel supporting surface to input portions of transfer units of a user machine, said transfer units being situated at a higher level than the fixed supporting surface, and said reels being placed flat one above the other and grouped in stacks on said fixed supporting surface; said device comprising:

a portal-shaped frame having two vertically extending posts and a cross-member, said cross-member being connected to said posts at upper end portions thereof, said frame being movably supported on wheels, said wheels being guidable along a guide, said guide extending between said supporting surface and said user machine;

a lifting platform being slidingly supported on said frame between said posts, said lifting platform having a first and a second end extending in a cantilever manner therefrom;

conveyor means for accommodating and respectively advancing a plurality of said reels, said reels being arranged on said conveyor means edgeways along a horizontal transfer direction, and said conveyor means extending between said first and second ends of said lifting platform;

shoulder means for supporting and guiding said reels while accommodated and respectively advanced by said conveyor means, said shoulder means being arranged laterally to said conveyor means and extending along said transfer direction; and actuation means for moving said platform between a loading position in which, said first end of said platform is adjacent to said fixed supporting surface, and an unloading position, in which said conveyor means enters with an output end corresponding to said second end of said platform between said input portions of said transfer units, and wherein said loading position has a level which is adjustable by set extents, said set extents being substantially equal to a thickness of each of the reels arranged flat one above the other on said supporting platform.

7. Device according to claim 6, wherein said platform comprises transfer means which are adapted to cause the advancement of said reels along said platform in a direction which is parallel to their axis; said transfer means cooperating, during use, with said conveyor means, when said platform is arranged in said unloading position, to cause the advancement of said reels toward said user machine.

8. Device according to claim 6, further comprising first substantially vertical guiding means and first slider means which are slidingly mounted along said first guiding means and support said platform; said actuation means being interposed between said first guiding means and said first slider means.

9. Device according to claim 8, further comprising second guiding means which are substantially perpendicular to said first guiding means and second slider means movable along said second guiding means; said second slider means supporting said first guiding means.

* * * * *